Dec. 11, 1934. T. SCHWEDENBERG ET AL 1,984,159
INHALING DEVICE
Filed Nov. 23, 1932  2 Sheets-Sheet 1

Inventors:
Theodor Schwedenberg,
Rudolf Auerbach,
Charles E. Mullen
Their Attorney.

Dec. 11, 1934. T. SCHWEDENBERG ET AL 1,984,159
INHALING DEVICE
Filed Nov. 23, 1932   2 Sheets-Sheet 2

Inventors:
Theodor Schwedenberg,
Rudolf Auerbach,
by Charles E. Mullen
Their Attorney.

Patented Dec. 11, 1934

1,984,159

UNITED STATES PATENT OFFICE 1,984,159

INHALING DEVICE

Theodor Schwedenberg, Berlin-Charlottenburg, and Rudolf Aüerbach, Neuenhagen, near Berlin, Germany, assignors to General Electric Company, Schenectady, N. Y.

Application November 23, 1932, Serial No. 644,114
In Germany November 26, 1931

2 Claims. (Cl. 204—32)

Our invention relates to inhaling devices and more particularly to devices for producing ionized air or other gases for inhalation. Preferably the ions in the air or the gas should have the same polarity.

It is an object of our invention to provide simple and efficient means for producing a gas for inhalation containing ions of a definite polarity.

It is a further object of our invention to produce an ionized gas such as air for inhalation by providing a point electrode in front of a fan and to charge the point electrode to a high direct current voltage of suitable polarity.

Other objects of our invention will appear from the following specification in connection with the drawings affixed to it and forming part thereof, in which some embodiments of our invention are illustrated diagrammatically by way of example.

In the drawings

Fig. 1 is a side elevation of one embodiment of our invention,

Fig. 2 being a similar view of another embodiment,

Fig. 3 is a curve diagram.

Figure 1:
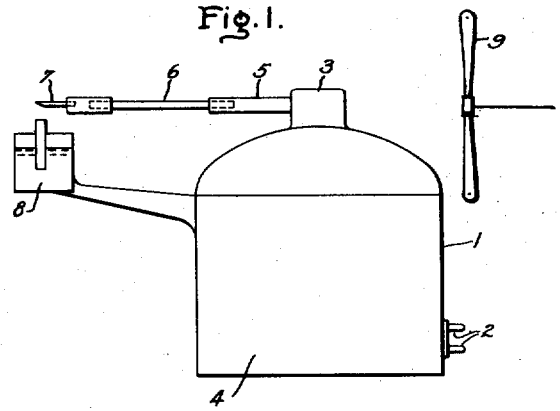

Referring to the drawings and first to Fig. 1, 1 is an electric boiler having terminals 2. 3 is a pressure valve, 4 is a body of water in the boiler 1. The steam produced in the boiler flows through a metal tube 5 and an insulating pipe 6, preferably a glass pipe, to a hollow point electrode 7 from which the steam escapes into the atmosphere. The hollow point electrode 7 can be formed like a nozzle and is charged to a high direct current voltage in the manner to be described hereinafter. 8 is a cup below the point electrode 7 containing a perfume or a medicinal substance, for instance eucalyptus oil.

The operation of this device is as follows:
The steam escaping from the point electrode 7 is ionized, since the point electrode is charged with a high D. C. voltage. If the steam is superheated relatively large ions are produced. If desired, a fan represented at 9 can be provided to produce an air current carrying along the ions escaping from the nozzle 7.

Figure 2:
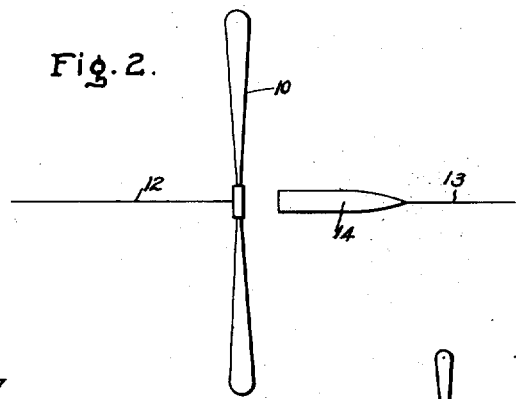
Figure 3:
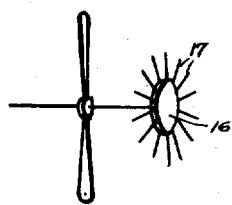
Fig. 3 is a vertical section of a third modification.
Figure 4:
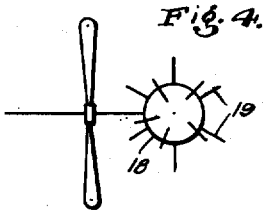
Figs. 4 and 5 show other modifications.

In the embodiment shown in Fig. 2, 10 is a fan secured to a motor shaft 12. 13 is a point electrode supported by an insulating member 14. In operation the air is accelerated by the action of the fan and ionized by the point electrode 13 which is charged to a high D. C. potential in the manner to be described hereinafter. Preferably the point electrode is arranged in the direction of the axis of the fan. If desired, instead of the point electrode a plate 16 may be arranged parallel to the plane of rotation of the fan as shown in Fig. 3, this plate being formed with a plurality of radially arranged points 17 which are charged to a high D. C. potential. The plate may be rotated during operation if desired. Instead of a plate a globular electrode 18 may be provided as shown in Fig. 4 carrying radially arranged points 19 charged with a high D. C. voltage. If desired, this globular electrode may be rotated during operation. Instead of connecting the point electrodes with the source of potential as described hereinafter, the electrodes may be charged by influence, for instance by providing a highly insulated conductor, for instance a sphere, near the point electrodes in alignment with the axis of the fan. By charging the point electrodes by influence they may be connected with the casing of the fan or with ground so that the high voltage is insulated against the fan and the electrodes can be touched without damage.

Figure 5:
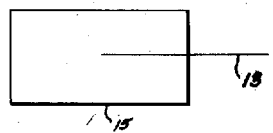

In the embodiment shown in Fig. 5 the point electrode 13 is surrounded by a tube 15. In operation the steam or oxygen accelerated by a fan (not shown) flows through the tube 15, being ionized by the point electrode 13 without nitrous gases being produced.

The point electrode may be hollow or solid. In the former case it may be formed with nozzle-like openings. Preferably during operation a flow of superheated steam, oxygen or the like is caused to pass along or through the point electrode in order to produce relatively large ions which secure a more efficient inhalation and in order to prevent the production of nitrous gases which might damage the body of the inhaler. The ions produced by the point discharge form nuclei of condensation for the superheated steam and in consequence thereof large ions having a large radius of action are produced.

If desired an auxiliary electrode, for instance a grid, may be arranged in front of the point electrodes, which is charged with the same polarity, but lower voltage, than the point electrode and which may be grounded. By suitably controlling the potential of the auxiliary electrode the quantity and size of the ions contained in the air for inhalation can be regulated.

If desired the point electrode may be rotated during operation about its own or some other axis.

If desired a scent or a medicament, for instance eucalyptus or an oxide or carbonate of magnesium, zirconium, aluminium, potassium, barium or some other not poisonous substance atomized by heating may be added to the ion carrier. For instance a cartridge containing the material to be added to the ionized air may be arranged near the point electrode and electrically heated.

Figure 6:
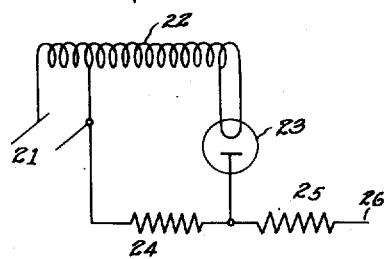
Fig. 6 is a wiring diagram of a device for charging the point electrode forming part of our invention.

In Fig. 6 is shown a device for charging the point electrode, 21 being the line terminals to which the fan can be connected. 22 is an auto-transformer, 23 a rectifier, 24 a load resistance, 25 a protective resistance and 26 a connection leading to the point electrode. Preferably the auto-transformer is a step-up transformer delivering a secondary high voltage, for instance 5000 volts. The transformer has high leakage and the secondary circuit has a high ohmic resistance of such value that the secondary current cannot exceed .2 milliampères so that it is not dangerous to touch the transformer.

Figure 7:
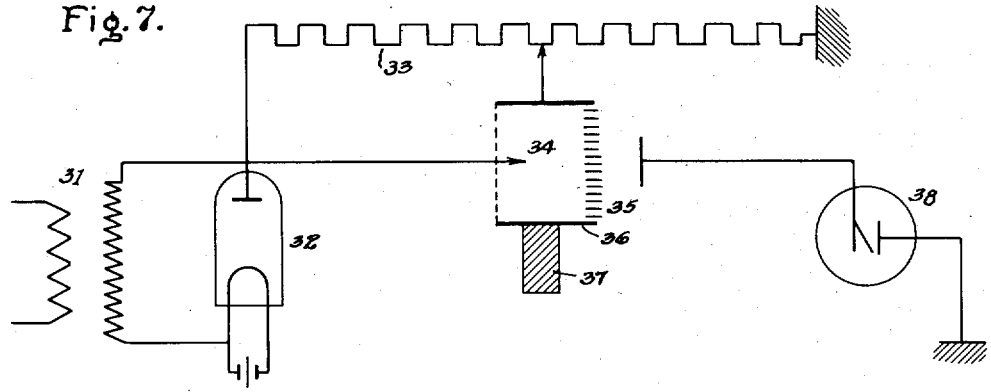
Fig. 7 shows a fourth embodiment.

Fig. 7 shows a device for controlling the quantity of ions by means of an auxiliary grid electrode and for measuring the screening effect of the auxiliary electrode. 31 is a step-up transformer, 32 a rectifying tube, 33 a potentiometer resistance, 34 the point electrode, 35 the auxiliary grid electrode, which forms the bottom of a metal cup 36 supported by an insulating member 37 and surrounding the point electrode 34. By changing the position of the movable contact of potentiometer 33 the potential of the cup 36 and of the auxiliary electrode 35 can be changed so that the quantity of ions escaping from the cup 36 can be regulated. 38 is a measuring device comprising an electrometer for measuring the quantity of ions.

Figure 8:
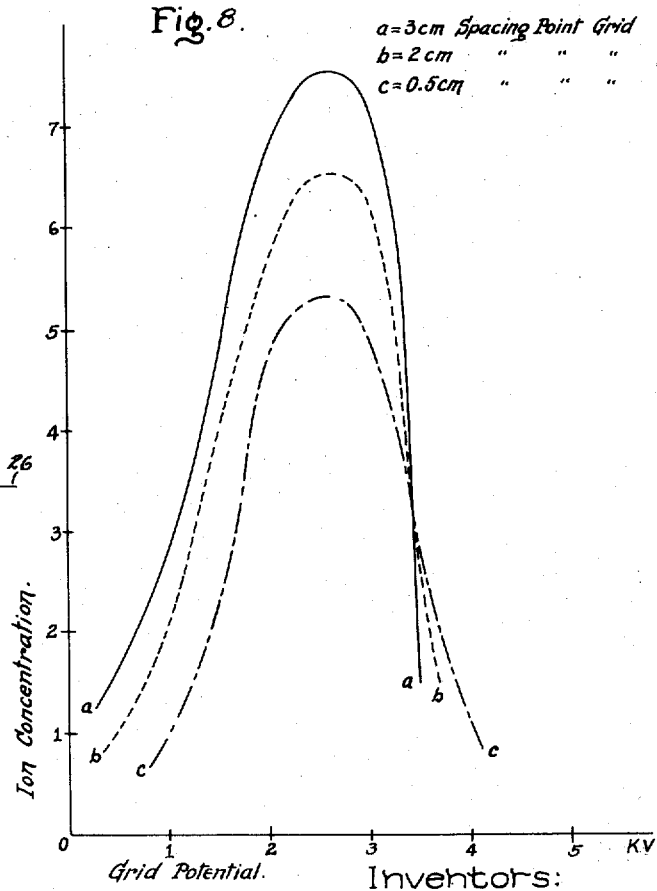

The influence of the potential of the auxiliary electrode and of the distance between it and the point electrode is shown in Fig. 8 in which the abscissæ indicate the potential of the auxiliary electrode in KV, the ordinates the relative ion concentration. There are shown three curves $a$, $b$, $c$, corresponding to a distance between the point electrode 34 and auxiliary electrode 35 of 30, 20 and 5 mms., respectively.

The radius of curvature of the point electrode should not exceed .2 mm.

We wish it to be understood that we do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

We claim:—

1. A device for producing ionized air for inhalation comprising a fan, a point electrode arranged in front of said fan, means for producing a flow of steam along said electrode and means for charging said point electrode with a high D. C. voltage.

2. A device for producing ionized air for inhalation comprising a fan, a tube comprising a point electrode arranged in front of said fan, means for producing a flow of steam through said tube and means for charging said point electrode with a high D. C. voltage.

THEODOR SCHWEDENBERG.
RUDOLF AÜERBACH.